US008850415B2

(12) United States Patent
Huuck et al.

(10) Patent No.: US 8,850,415 B2
(45) Date of Patent: Sep. 30, 2014

(54) GENERATING A TRANSITION SYSTEM FOR USE WITH MODEL CHECKING

(75) Inventors: Ralf Huuck, Haymarket (AU); Ansgar Fehnker, Surry Hills (AU); Patrick Jayet, Epalinges (CH); Felix Rauch Valenti, Maroubra (AU)

(73) Assignee: National ICT Australia Limited, Eveleigh, New South Wales (AU)

(*) Notice: Subject to any disclaimer, the term of this patent is extended or adjusted under 35 U.S.C. 154(b) by 997 days.

(21) Appl. No.: 12/441,889

(22) PCT Filed: Sep. 13, 2007

(86) PCT No.: PCT/AU2007/001355
§ 371 (c)(1),
(2), (4) Date: Aug. 11, 2009

(87) PCT Pub. No.: WO2008/034170
PCT Pub. Date: Mar. 27, 2008

(65) Prior Publication Data
US 2009/0307664 A1    Dec. 10, 2009

(30) Foreign Application Priority Data
Sep. 20, 2006 (AU) ................. 2006905207

(51) Int. Cl.
*G06F 9/45* (2006.01)
*G06F 11/36* (2006.01)
(52) U.S. Cl.
CPC ..... *G06F 11/3608* (2013.01); *Y10S 707/99933* (2013.01)
USPC ........... 717/141; 717/106; 717/136; 717/124; 707/999.003; 707/E17.014

(58) Field of Classification Search
None
See application file for complete search history.

(56) References Cited

U.S. PATENT DOCUMENTS 5,694,593 A * 12/1997 Baclawski ............................ 1/1
6,289,502 B1 * 9/2001 Garland et al. ................ 717/104
6,505,342 B1 * 1/2003 Hartmann et al. ............. 717/104
(Continued)

FOREIGN PATENT DOCUMENTS

WO    WO 01/01256    1/2001

OTHER PUBLICATIONS

Ansgar Fehnker et al., "Goanna—A Static Model Checker", Aug. 26, 2008, 4 pgs.
(Continued)

*Primary Examiner* — Chameli Das (57) ABSTRACT

The invention concerns model program analysis of software code using model checking. Initially, a transition system (22) and an extensible markup language (XML) (24) representation of the data is generated. Next, labels (26) for the transition system are generated by querying the XML representation of the data using (markup) query language. The labels and the structure of the transition system are then used as input to model checking techniques to analyse the software code (28). It is an advantage of the invention that the problem of labelling a transition system can be transformed into the XML domain so that detailed information about the software code can be extracted using queries in a format that can be run in the XML domain which are well known. At the same time the transformation to the XML domain does not prevent the use of efficient model checking technologies.

15 Claims, 7 Drawing Sheets

(56) References Cited

U.S. PATENT DOCUMENTS

| | | | |
|---|---|---|---|
| 6,550,057 B1* | 4/2003 | Bowman-Amuah | 717/126 |
| 6,944,596 B1* | 9/2005 | Gray et al. | 705/321 |
| 7,072,876 B1* | 7/2006 | Michael | 706/45 |
| 7,137,100 B2* | 11/2006 | Iborra et al. | 717/106 |
| 7,287,248 B1* | 10/2007 | Adeeb | 717/136 |
| 7,421,680 B2* | 9/2008 | DeLine et al. | 717/126 |
| 7,673,261 B2* | 3/2010 | Adir et al. | 716/106 |
| 7,797,669 B1* | 9/2010 | Rehof et al. | 717/100 |
| 7,941,438 B2* | 5/2011 | Molina-Moreno et al. | 707/756 |
| 8,151,276 B2* | 4/2012 | Grechanik et al. | 719/316 |
| 8,260,597 B1* | 9/2012 | Raghavan et al. | 703/13 |
| 8,726,233 B1* | 5/2014 | Raghavan | 717/113 |
| 2002/0062463 A1 | 5/2002 | Hines | |
| 2002/0184610 A1* | 12/2002 | Chong et al. | 717/109 |
| 2003/0158720 A1* | 8/2003 | Liu | 703/17 |
| 2003/0237050 A1* | 12/2003 | Davidov et al. | 715/513 |
| 2004/0068494 A1* | 4/2004 | Tozawa et al. | 707/3 |
| 2004/0233232 A1* | 11/2004 | Iborra et al. | 345/700 |
| 2005/0015752 A1 | 1/2005 | Alpern et al. | |
| 2005/0081192 A1* | 4/2005 | DeLine et al. | 717/126 |
| 2005/0091666 A1 | 4/2005 | Wilkinson et al. | |
| 2005/0097084 A1* | 5/2005 | Balmin et al. | 707/3 |
| 2005/0114494 A1* | 5/2005 | Beck et al. | 709/224 |
| 2005/0129196 A1* | 6/2005 | Creamer et al. | 379/88.18 |
| 2005/0131978 A1* | 6/2005 | Meredith et al. | 708/446 |
| 2005/0166167 A1 | 7/2005 | Ivancic et al. | |
| 2005/0273772 A1* | 12/2005 | Matsakis et al. | 717/136 |
| 2006/0059444 A1* | 3/2006 | Murthy et al. | 716/5 |
| 2006/0075305 A1* | 4/2006 | Robinson et al. | 714/38 |
| 2006/0161404 A1* | 7/2006 | Campbell et al. | 703/2 |
| 2006/0212859 A1* | 9/2006 | Parker et al. | 717/143 |
| 2006/0256736 A1* | 11/2006 | Koehler et al. | 370/254 |
| 2007/0006151 A1* | 1/2007 | Conway et al. | 717/120 |
| 2007/0150486 A1* | 6/2007 | Wen et al. | 707/100 |
| 2007/0179639 A1* | 8/2007 | Sakai | 700/29 |
| 2007/0282593 A1* | 12/2007 | Thompson et al. | 704/9 |
| 2008/0065674 A1* | 3/2008 | Liu et al. | 707/102 |
| 2008/0086722 A1* | 4/2008 | Kahlon et al. | 717/131 |
| 2008/0134020 A1* | 6/2008 | Adeeb | 715/239 |
| 2008/0147382 A1* | 6/2008 | Mishra et al. | 704/10 |
| 2008/0189094 A1* | 8/2008 | Adir et al. | 703/14 |
| 2008/0320486 A1* | 12/2008 | Bose et al. | 718/105 |
| 2009/0204940 A1* | 8/2009 | Kodosky et al. | 717/106 |
| 2009/0328067 A1* | 12/2009 | Srinivasan et al. | 719/316 |
| 2010/0070960 A1* | 3/2010 | Atsatt | 717/166 |
| 2010/0106705 A1* | 4/2010 | Rush et al. | 707/709 |
| 2011/0153641 A1* | 6/2011 | Thorup et al. | 707/769 |
| 2012/0131351 A1* | 5/2012 | Balinsky et al. | 713/189 |

OTHER PUBLICATIONS

Raihan Al-Ekram et al., An XML-based Framework for Language Neutral Program Representation and Generic Analysis, Proceedings of the 28th Annual International Computer Software and Applications Conference, COMPSAC, vol. 2, 2004, pp. 10-11.

Michael Eichberg et al., "XIRC: A Kernel for Cross-Artifact Information Engineering in Software Development Environments", Nov. 8, 2004, 11 pgs.

Pavel Zezula et al., "Tree Signatures and Unordered XML Pattern Matching", Computer Science, vol. 2932, 2004, pp. 122-139.

G. Antoniol et al., Complier Hacking for Source Code Analysis, Software Quality Journal 12, pp. 383-406, 2004.

Alan Frisch, XPath Library for OCaml, http://alain.frisch.fr/.soft.html, 6 pages, Nov. 9, 2007.

D. Schmidt et al., Program Analysis as Model Checking of Abstract Interpretations, Proc. of Static Analysis Symposium (SAS'98) Pisa, Italy, 30 pages, 1998.

B. Chelf et al., How to Write System-specific, Static Checkers in Metal, Proceedings of workshop on Program analysis for software tools and engineering (PAST), AXM Press, 10 pages, Nov. 2002.

Coverity, Inc. Coverity: Automated Error Prevention and Source code Anaysis, http://www.coverity.com, 1 page, Dated: 2009.

D. Engler, et al., Checking System Rules Using System-Specific, Programmer-Written Complier Extensions, Proc. of the Fourth Symposium on Operating Systems Design and Implementation (OSDI), 16 pages, San Diego, CA, 2000.

Edison Design Group, Inc., Complier Front Ends for the OEM Market, http://www.edg.com, 1 page, Dated: Mar. 18, 2009.

T. Gschwind et al., TU Analyzer—Analyzing Templates in C++ Code, Proc. of the 11th IEEE Working Conference on Reverse Engineering, pp. 48-57, 2005.

B. Hailpern et al., Software Debugging, Testing, and Verification, IBM Systems Journal, 41(1), pp. 4-12, Feb. 2002.

RTI. The Economic Impacts of Inadequate Infrastructure for Software Testing, http://www.nist.gov/director/prog-ofc/report02-3.pdf, 309 pages, May 2002.

Software Security, Protect your Software at the Source, Fortify Software, http://www.fortify.com/resoures/download_rats.htm, 2 pages, Dated: 2009.

Calculating The Total Cost of Development, Is Open Source Security Really Free? RSA Security Inc., 2002; 1 page.

Dennis Dams, Kedar S. Namjoshi, Orion: High-Precision Methods for Static Error Analysis of C and C++ Programs, pp. 138-160 Formal Methods for Components and Objects, 4th International Symposium, FMCO 2005, Amsterdam, The Netherlands, Nov. 1-4, 2005, Revised Lectures. Lecture Notes in Computer Science 4111 Springer 2006 ISBN 3-540-36749-7.

* cited by examiner

Example to match with ASTexample.pdf
It is simplified and NOT a real example.

```
<FuncDecl id="f1" name="fun">
<Parameter id="par1" name="n" />
  <Decl id="decl1">
    <Var id="var1" name="f" />
  </Decl>
  <Assign id="assign1">
    <Op1 varid="var1" name="f" />
    <Op2 const="1" />
  </Assign>
  <While id="while1">
    <Cond>
      <Compare op="gt">
        <Op1 varid="par1" name="n" />
        <Op2 const="0" />
      </Compare>
    </Cond>
    <Body>
      <Assign id="assign2">
        <Op1 varid="var1" name="f" />
        <Op2>
          <Expression op="multiply">
            <Op1 varid="var1" name="f" />
            <Op2 varid="par1" name="n" />
          </MultExpr>
        </Op2>
      </Assign>
      <Assign id="assign3">
        <Op1 varid="par1" name="n" />
        <Op2>
          <Expression op="subtract">
            <Op1 varid="par1" name="n" />
            <Op2 const="1" />
          </SubtractExpr>
        </Op2>
      </Assign>
    </Body>
  </While>
  <Return>
    <Op1 varid="var1" name="f" />
  </Return>
</FuncDecl>
```

Fig. 5

```
<Decl cfgid="33" line="4" role="body" >
  <Var cfgid="33" name="i" static="false" ... role="exp" >
    <Int cfgid="33" low=" " high="20" role="init" />
    <Type cfgid="33" type="Integer" role="type" />
  </Var>
</Decl>
<For cfgid="45" line="5" role="body" >
  <Decl cfgid="47" line="5" role="init" >
    <Var cfgid="47" name="a" static="false" ... role="exp" >
      <Int cfgid="47" low=" " high="0" role="init" />
      <Type cfgid="47" type="Integer" role="type" />
    </Var>
  </Decl>
  . . .
```

GENERATING A TRANSITION SYSTEM FOR USE WITH MODEL CHECKING

TECHNICAL FIELD

The invention concerns generating a transition system for use with model checking of data. In particular, but not limited to, the data may be software code and model checking may form part of program analysis, such as static program analysis. The invention also concerns software installed on a computer system to perform the method of the invention.

The software is stored in a machine-readable medium that communicates with the computer system. The machine-readable medium includes any mechanism that provides (i.e., stores and/or transmits) information in a form readable by a machine such as a computer or processor. For example, a machine-readable medium includes read only memory (ROM); random access memory (RAM); magnetic disk storage media; optical storage media; flash memory devices; electrical, optical, and acoustical.

BACKGROUND ART

Software product development is very much driven by two objectives: short time-to-market and low development costs. However, the current best practice of software development is still expensive, time consuming, and creates unnecessary expenses which often occur in later stages of product development or even after product deployment.

One of the reasons are errors or flaws in the software's source code, such as software bugs, which are both expensive and time consuming to detect. Finding such software bugs, or in turn giving an insurance of their absence, is therefore of great importance in software development.

Research [AS] done by the consulting firm @stake Inc. (now acquired by Symantec) shows that resolving for example, security related bugs is about twice as expensive during the testing phase than during the implementation phase, and it is even about ten times more expensive after deployment. This does not include indirect costs such as loss of customer goodwill or the occurrence of liabilities.

Dynamic testing is one approach to program analysis. Given a set of input values the software to be tested is executed and its behaviour observed. In particular, the output, (i.e., the result of executing the program) is compared to what has been specified. Dynamic testing is mostly concerned about the functional correctness of code. It provides answers to questions like: "Does this program compute the square root of the input value?" or "Does this program return the list of employees in alphabetical order?" Typically, testing is not exhaustive. This means, there is no way to test for every possible scenario. Moreover, it is cumbersome to generate appropriate test cases and time consuming to run those tests.

Static analysis, as the name suggests, is a static approach to program analysis. This can be done at compile-time or even before, when only certain code fragments are available. Static analysis can be described as a sophisticated way of "looking" at the code, examining it, and approximating its behaviour. Just by observing the code structure in a smart way many properties can be checked (e.g., "Are all declared variables initialised before the program reaches the point of their first use?", "Are programming guidelines respected?", or "Are certain programming constructs such as pointers handled in a safe manner?").

The class of problems addressed by static analysis is usually different to the ones addressed by dynamic testing. However, many static properties have an immediate impact for dynamic properties. For instance, a pointer mishandling can lead to a program crash which certainly violates functional requirements. Moreover, static analysis is typically exhaustive (i.e., if no property violation (bug) is found, it is guaranteed that this bug will not occur).

It has been shown in theory that static analysis problems can be stated as model checking problems [SS98]. Model checking is a technique that allows the searching of large finite state spaces in a very efficient manner with respect to certain properties. Typically, the state space is represented as a transition system (i.e., a graph annotated with labels) and the properties are expressed in temporal logic formulas over these labels. Transforming a static analysis problem into a model checking problem has two advantages. Firstly, there are free tools available that solve model checking problems efficiently and secondly, many static analysis properties can be expressed in a natural way as temporal logic formulae.

Figure 11:
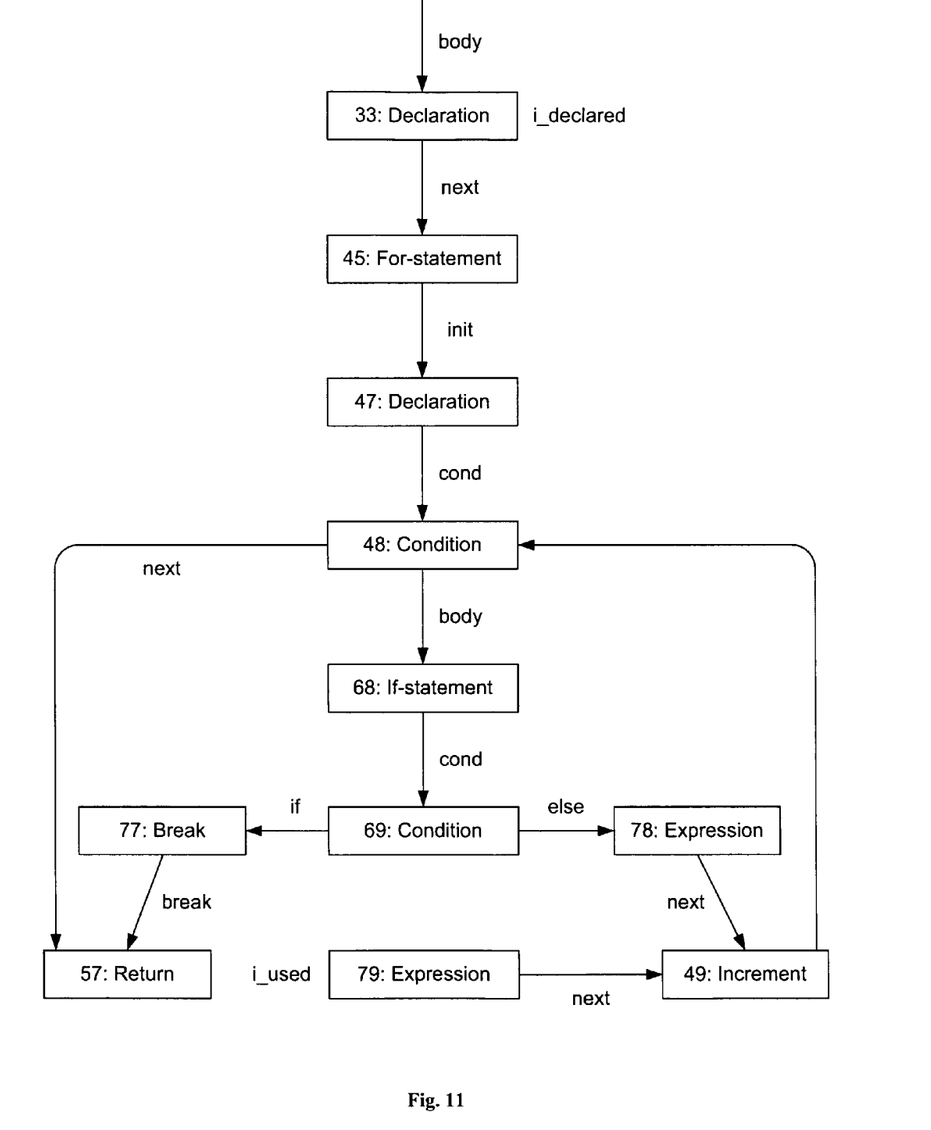
FIG. 11 shows a known labelled control flow graph for a small example program.

Consider the labelled (annotated) control flow graph (CFG) as depicted in FIG. 11. The CFG represents the (control) structure of a program, and contains information about the location of loops, branches, or straight line code. It typically does not contain "deeper" information (e.g., where variable i is declared or where it is used). The annotations do that, for example, they are labels added to every location where i is declared or used.

A static analysis/model checking property can be: "It is always the case that if variable i is declared it must be used somewhere in the future." This property is already natural language expression of temporal logic and looks in a more formal notation as follows:

$$AG(i\_declared \Rightarrow EF\ i\_used)$$

where AG means (informally) "always" and EF "somewhere in the future". The labels i_declared and i_used are attached to those program locations where they are true. Given such a CFG (which is a transition system) annotated with labels, model checking can check formulas as the above automatically.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

The invention concerns a method of generating a transition system for use with model checking of data, the method comprising the steps of:
  generating the transition system from the data;
  generating an extensible markup language (XML) representation of the data;
  generating labels for the transition system by querying the XML representation of the data using (markup) query language; and
  using the labels and the structure of the transition system as input to model checking techniques to analyze the data.

It is an advantage of the invention that the problem of labelling a transition system can be transformed into the XML domain so that detailed information about the data can be extracted using queries in a format that can be run in the XML domain which are well known. At the same time the transformation to the XML domain does not prevent the use of efficient model checking technologies.

The data may be source code. Static analysis of the source code may:
- identify the presence or absence of a class of software bugs in the source code;
- find security vulnerabilities of the source code;
- determine metrics of the source code; and/or
- timing analysis of the source code.

The method may be performed as the source code is being written or during compile time.

Querying the XML representation of the data comprises running a query on the XML representation of the data and the query may check for static properties of the source code, for example, location of variable and function declarations, comparisons between variables and numbers, initialisations of variables or data structures, modifications of variables or data structures and uses of various program elements such as variables, data structures, functions or numbers. Other static properties include function calls (in general or for specific functions that may deal, for example, with memory management) and control-flow statements (for example, if, switch, return, or all loop statements).

The method may comprise the initial step of generating an abstract syntax tree representation of the source code, and the steps of generating the transition system and generating the XML representation of the data may be based on the abstract syntax tree representation of the data.

The query may define temporal logic over the data. The query may identify tree patterns in the underlying abstract syntax tree representation of the data.

The query may return the identifier of the node that matches the query. The step of generating labels may include labelling in the transition system the node corresponding to the node that matched by the query. The node in the transition system may be identified by the same node identifier in the XML representation and the transition system. The node may be identified by the same identifier in the abstract syntax tree.

Steps of the method of the invention may be performed in parallel.

The query may be a user selected query from a set of predetermined queries, such as a library. Alternatively, or in addition, the query may be created by the user. The query may be selected or created using a software user interface.

The transition system may be a control flow graph. Alternatively, the transition system may be a data flow graph or an information flow graph.

The query language may be XPath. The advantages of the embodiment of the invention of using XPath as a query language to generate labels used for model checking techniques are:

1. Since XPath is a powerful query language it allows the specification of complex patterns and as such allows the checking for complex properties. For example, in program analysis the queries can find loops in which the loop counter is modified, or for statements in which the execution order of the involved expressions is undefined and may cause undefined or undesirable results. The embodiment enables easy extendibility and flexibility allowing developers to adapt the solution to their needs.
2. The XPath language is an accepted standard with a W3C recommendation on it. There are also efficient and free (LGPL) implementations of XPath readily available. This has the advantage that the invention requires less training for use compared to methods which require a from scratch design.
3. The embodiment relates to fully automatic analysis of source code. This means the application does not require any background knowledge of the user and it does not require any refitting or modelling of the code for analysis purposes. Moreover, given a property specification (requirement) the analysis is typically faster than testing, mostly of the same order as the compile time and it does not require any test case generation etc. The invention addresses parts of the technology for static program analysis.

The step of generating an XML representation of the data may comprise only generating the data structures of the XML representation necessary to allow queries to be performed on it.

In a further aspect the invention comprises software installed on a computer system to control the computer system to operate in accordance with the method described above.

BRIEF DESCRIPTION OF THE DRAWINGS

Examples of the invention will now be described with reference to the following drawings in which.

BEST MODES OF THE INVENTION

Figure 1:
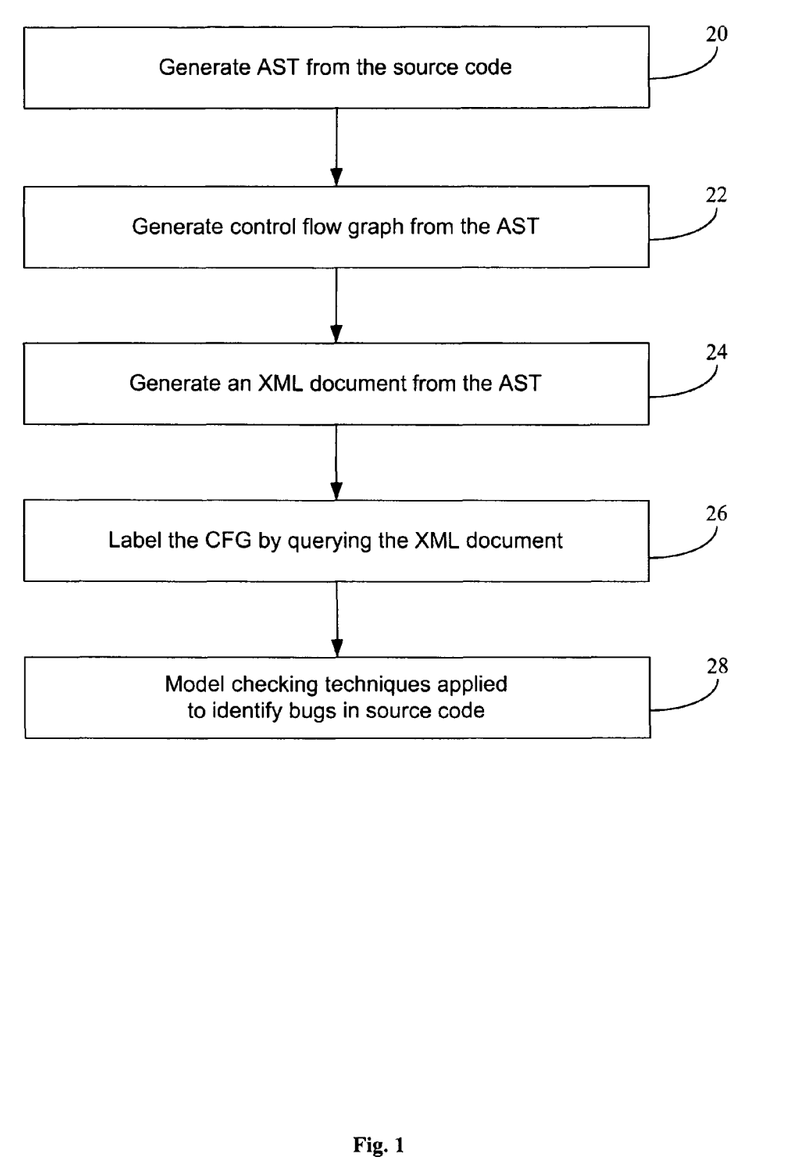
FIG. 1 shows a flowchart for the method of the invention.

An example of using the invention to detect static software bugs in source code using model checking will now be described with reference to the flowchart of FIG. 1. We note that while this flow chart has been depicted as a flow of sequential steps, in fact some steps can be performed in parallel. For example, steps 22 and steps 24 of FIG. 1 can be performed in parallel.

Figure 2:
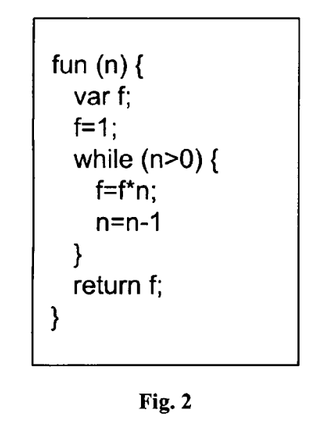
FIG. 2 shows the source code of a sample program.
Figure 3:
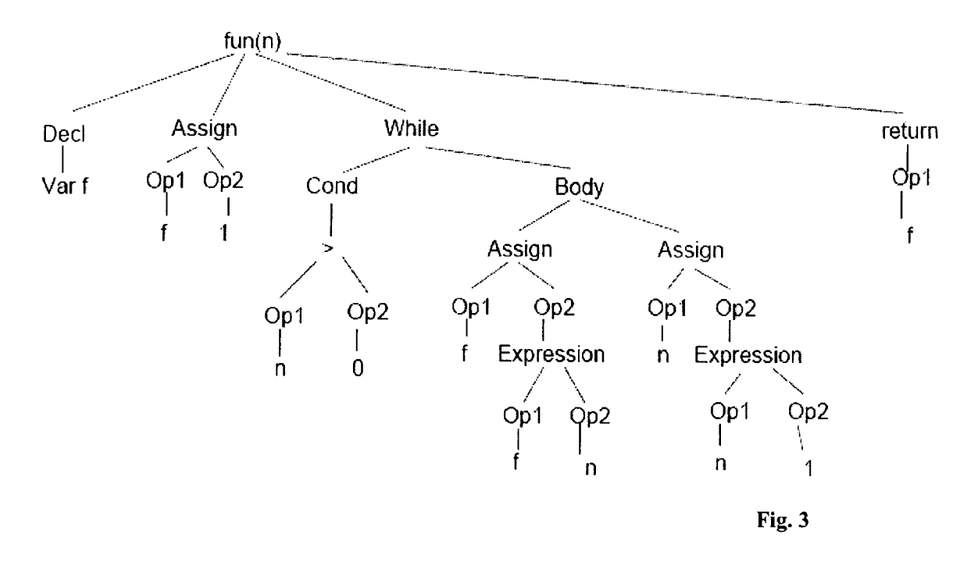
FIG. 3 is a abstract syntax tree of the sample program of FIG. 2.

Take the source code of the sample program shown in FIG. 2. This sample program is automatically converted 20 to an abstract syntax tree (AST) shown in FIG. 3. An AST is a labelled tree, where the nodes are labelled by operators of a program, and where the leaf nodes represent its operands (i.e., variables or constants). The AST is an intermediate structure generated when parsing (i.e., reading in) a program and it is a natural precursor to the control flow graph (CFG). Every node in the AST has a unique identifier called a node ID (not shown).

Figure 4:
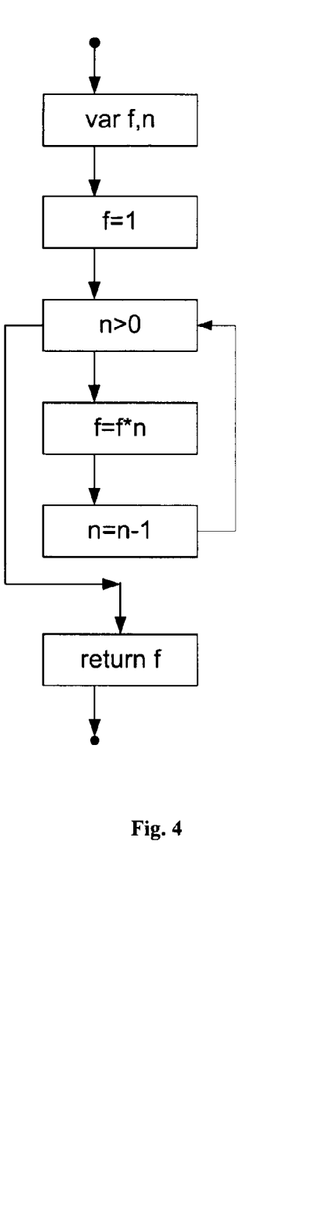
FIG. 4 is a control flow graph (CFG) of a program similar to the sample program of FIG. 2.
Figure 5:
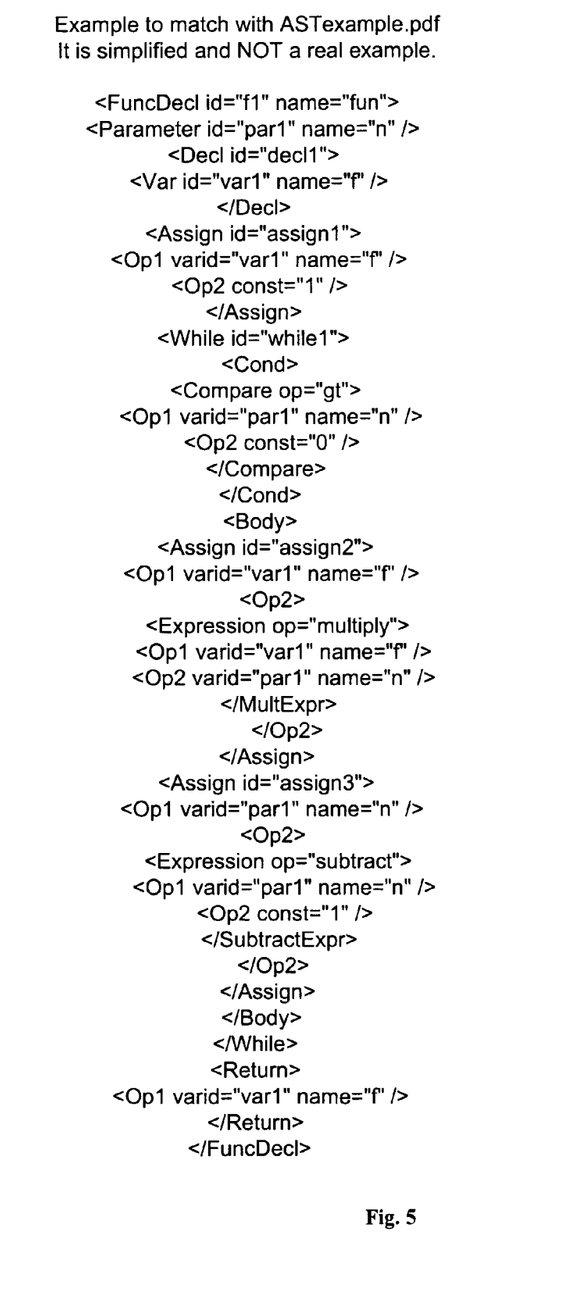
FIG. 5 is a simplified Extensible Markup Language (XML) representation of the sample program of FIG. 2.

Next, we automatically generate 22 a CFG as shown in FIG. 4. In this example from the AST. Information from the AST is translated to the CFG format, including node IDs. The aim now is to label (annotate) the CFG so that we can apply model checking techniques to detect software bugs in the original source code. To do this we also generate 24 an XML document from the AST as shown in FIG. 5. The XML document (FIG. 5) is a direct translation of the AST. In this way the XML document also has all the same information as the AST of FIG. 2. Again this includes the node IDs. In this XML document the node IDs are flagged by the markers including the term "id".

Next we label 26 the CFG so that we can apply model checking techniques. We identify locations in the CFG by querying the XML document version of the source code using temporal logic. Pattern matching is the act of checking for the presence of a given pattern (in our case tree structures) in a larger structure (in our case the AST). Tree structures are very powerful and allow the definition of complex patterns. The approach is based on pattern matching program constructs on the abstract syntax tree.

The core of the invention is to use tree pattern matching algorithms and query languages from a different domain: XML document processing. In this embodiment, we use XPath as a query language to identify our labels. XPath (XML Path Language) is a terse (non-XML) syntax for addressing portions of an XML document and allows the specification of tree patterns in a very convenient way. There are also freely available (LGPL) efficient implementations available that can be used.

Figure 6:
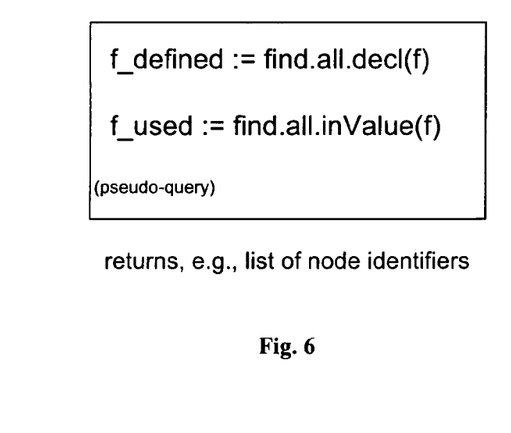
FIG. 6 shows two pseudo-queries that could be applied to the XML representation of FIG. 5 in order to label to the CFG of FIG. 4.

FIG. 6 shows two pseudo queries that could be applied to the XML representation of the source code to identify tree patterns. The first query locates instances in which a variable "f" is defined. The representation of this query in XPath syntax would appear as follows:

//Decl/Var[@name='f']

The second query finds locations where the variable "f" is used in the code. A representation of a simplified version of this query, which matches the code in FIG. 5 in the XPath syntax would (simplified) read as follows:

//Compare //compare/*[@name='f'] ]|//Assign/Op2/*[@name='f']

Figure 7:
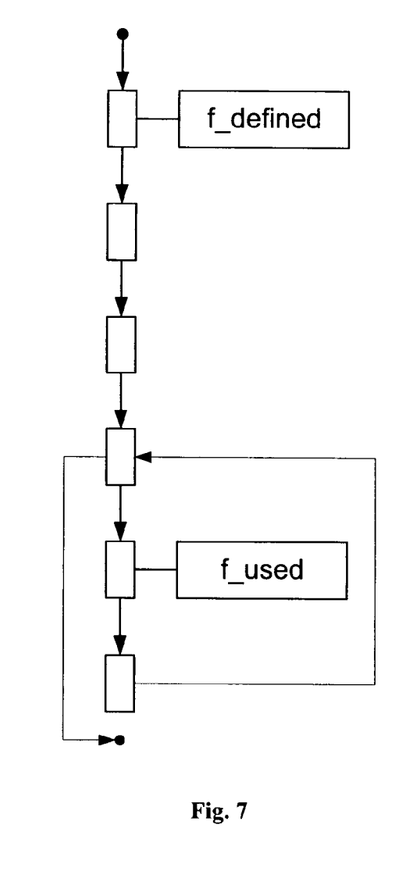
FIG. 7 shows the CFG with labels.

The queries return node IDs, and the node ids then directly relate to the corresponding node IDs in the CFG. Each query returns the node IDs included in the XML document at which the query is matched. The corresponding position on the CFG is then easy to identify by finding the node that has the same node ID in the CFG. That node is then given a suitable label corresponding to the query. The resulting labelled CFG is shown in FIG. 7.

Since the CFG is now labelled, known model checking techniques can be applied 28 to the CFG to perform program analysis such as the identification of software bugs.

Figure 8:
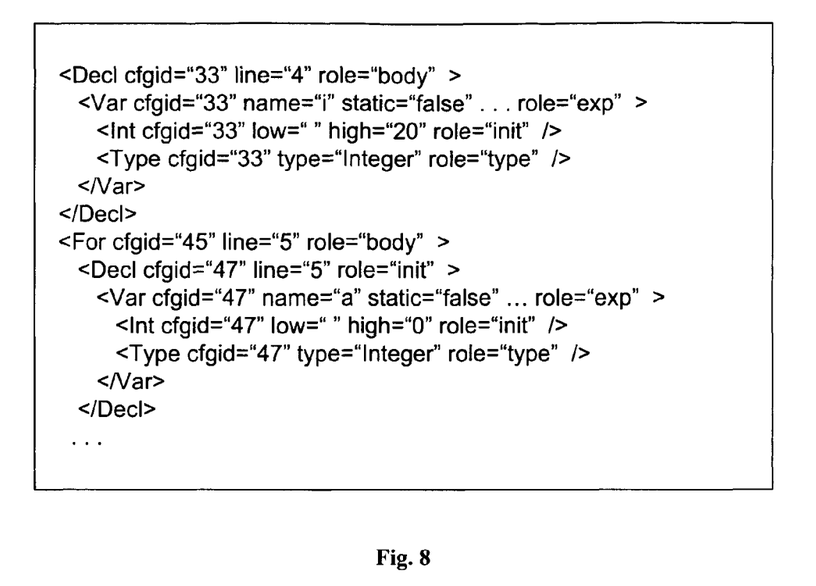
FIG. 8 is a further example of an XML representation of a sample source code.
Figure 9:
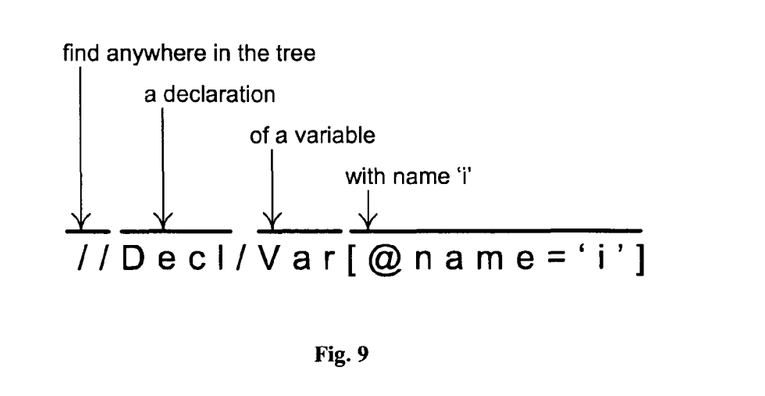
FIG. 9 is a XPath query that can be applied to the XML representation of FIG. 8.

A further example will now be described. In FIG. 8 we see an XML representation of parts of an AST. The respective XPath query to find (match) the nodes where variable i is declared is constructed as shown in FIG. 9.

This XPath query now defines which nodes in the CFG should be labelled with i_declared. When applied to the XML fragment in FIG. 8, the node <Decl> with cfgid "33" should be labeled, whereas the node with cfgid "47" should not. The node in the CFG that has this identifier "33" and a label is associated accordingly.

As described above converting the source code to an annotated model, given a set of properties, is done in a number of stages (steps 20 to 28). Parsing the source code yields an AST, which is prerequisite to build the CFG. The static analysis properties define atomic propositions, using XPath queries on the XML representation of the parse tree, to determine which nodes have to be annotated. The XML representation of the AST and the queries together are used by the XPath engine, to determine which atomic propositions are valid in what states. This information, together with the structure of the CFG are the building blocks of the model checking input.

Figure 10:
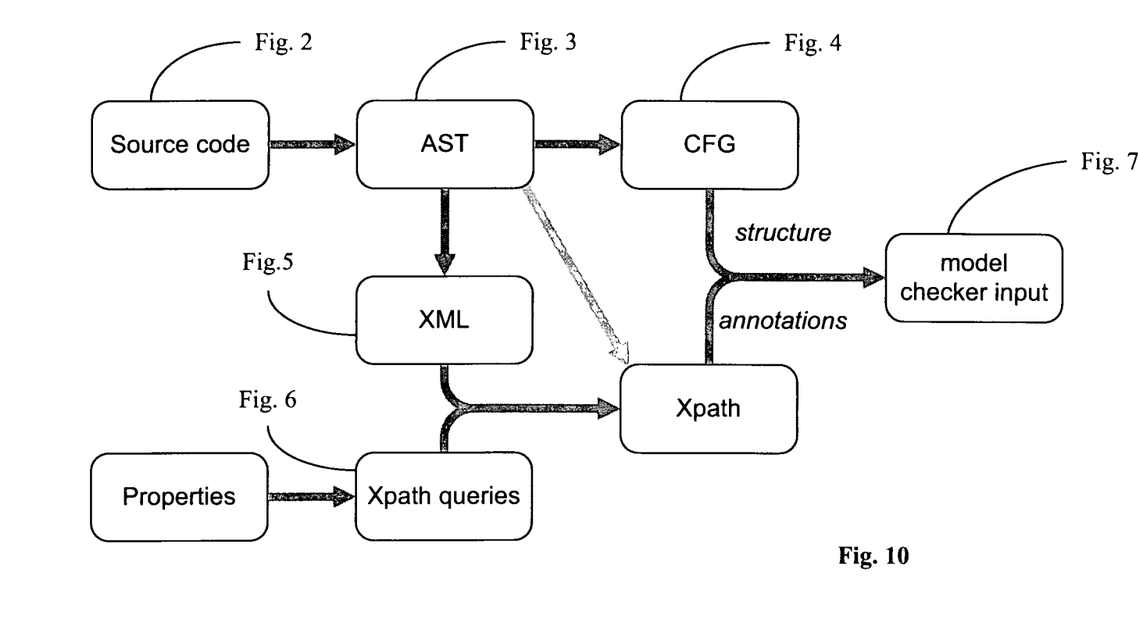
FIG. 10 shows graphically the general architecture of the code and property input model conversion.

The general architecture of the code and property input model conversion using the invention is shown in FIG. 10.

To optimise the method, there is no need to generate the XML document that represents the AST, but instead build the corresponding data structures that can directly be used by the XPath library that is used to perform the queries. With this optimisation, the full XML documents do not need to be generated in one step, and in the next step the XPath library has to parse these files again. By going directly to the XPath structures overhead is saved. This modification is depicted in FIG. 10 as grey link between AST and XPath.

The invention may be provided as software. When the software is installed on a computer system it is able to operate the computer system to perform the method described above. The computer includes an output device, such as a monitor, to present a user interface to the user. Using the interface the user can run their own XPath queries and construct their own properties (queries). The computer system may include storage means to store a library of queries. Parts of the method can be performed as the user is writing the source code. Alternatively, the method may be performed during compile time.

The invention may use query libraries, such as Frisch's XPath library [Fri00] for OCaml, to query its internal XML data structures for patterns of interest. Both XML and XPath are well standardised languages. Using such standards enables the invention to be used with software libraries that integrate into OCaml and offer an interface to execute XPath queries on XML data.

The invention can be applied to a range of programming languages of the source code, including C and C++. Besides other imperative programming languages that are similar to C and C++, like JAVA the technology can also be applied to assembly language programs. In the case of assembly languages the queries may be less powerful on degenerated ASTs resulting from low-level assembly programs.

Quantitative Model Checking is concerned with checking for optimal behaviour. Rather than annotating states with atomic propositions, the model is annotated with weights on states and transitions. The technology described in this document can also be used to generate weights for quantitative model checking.

Once a bug is tested using the invention, the invention can be used to also give explanations why they occur and how they can be fixed. For example, a detailed explanation that not only highlights the error, but also pinpoints its location including a potential execution path that leads to this error. This would be a valuable assistance to the user in increasing software development productivity.

It will be appreciated by persons skilled in the art that numerous variations and/or modifications may be made to the invention as shown in the specific embodiments without departing from the spirit or scope of the invention as broadly described. For instance, some of the steps shown in FIG. 1 could be carried out in parallel rather than sequentially, as shown.

For example, as part of program analysis the method could be used for finding defects in programs, finding security vulnerabilities, generic program analysis (i.e. computing metrics about programs) and timing analysis (i.e. making statements about a program's worst case execution times or for optimisation).

The present embodiments are, therefore, to be considered in all respects as illustrative and not restrictive.

The invention claimed is:

1. A non-transitory machine-readable medium storing one or more instructions for generating a labeled transition system for use with model checking of source code in a computer, which when executed by a processor of the computer, cause the processor to perform operations comprising:

generating a transition system from the source code;

generating an extensible markup language (XML) representation of the source code comprised of nodes, each node having an identifier;

generating labels for the transition system to form the labeled transition system by running a query on the XML representation of the source code using query language to return an identifier of a node that matches the query and labeling a node in the transition system identified by the same identifier as the node that matched the query; and using the labels and the structure of the labeled transition system as input to model checking techniques to analyze the source code.

2. The processor performed operations of claim 1, wherein the model checking techniques involve static analysis of the source code.

3. The processor performed operations of claim 2, wherein static analysis of the source code comprises:

identifying presence or absence of a class of software bugs in the source code;

finding security vulnerabilities of the source code; and performing worst case execution timing analysis of the source code.

4. The processor performed operations of claim 1, wherein the operations are performed as the source code is being written or during compile time.

5. The processor performed operations of claim 1, wherein the query checks for static properties of the source code.

6. The processor performed operations of claim 1, wherein the operations further comprise initially generating an abstract syntax tree representation of the source code, and wherein the operations of generating the transition system and generating the XML representation of the source code are based on the abstract syntax tree representation of the source code.

7. The processor performed operations of claim 6, wherein the query identifies tree patterns in the abstract syntax tree representation of the source code.

8. The processor performed system of claim 1, wherein the operations further comprise generating an abstract syntax tree representation of the source code, wherein the operations of generating the transition system and generating the XML representation of the source code are based on the abstract syntax tree representation of the source code, and wherein the node that matched the query in the XML representation of the source code is identified by the same identifier in the abstract syntax tree representation of the source code.

9. The processor performed operations of claim 1, wherein the operations of generating the transition system and generating the XML representation of the source code are performed, at least in part, simultaneously.

10. The processor performed operations of claim 1, wherein running the query on the XML representation of the source code comprises selecting the query from a set of predetermined queries.

11. The processor performed operations of claim 1, wherein the query is created by a user.

12. The processor performed operations of claim 1, wherein the labeled transition system is a control flow graph, a data flow graph or an information flow graph.

13. The processor performed operation of claim 1, wherein the query language is XML Path Language (XPath).

14. The processor performed operations of claim 1, wherein the operation of generating an XML representation of the source code comprises only generating data structures of the XML representation necessary to allow running of the query.

15. Software, comprising computer readable instructions stored on a non-transitory computer readable medium, installed on a computer system to control the computer system to perform the operations according to claim 1.

* * * * *